United States Patent Office 3,427,980
Patented Feb. 18, 1969

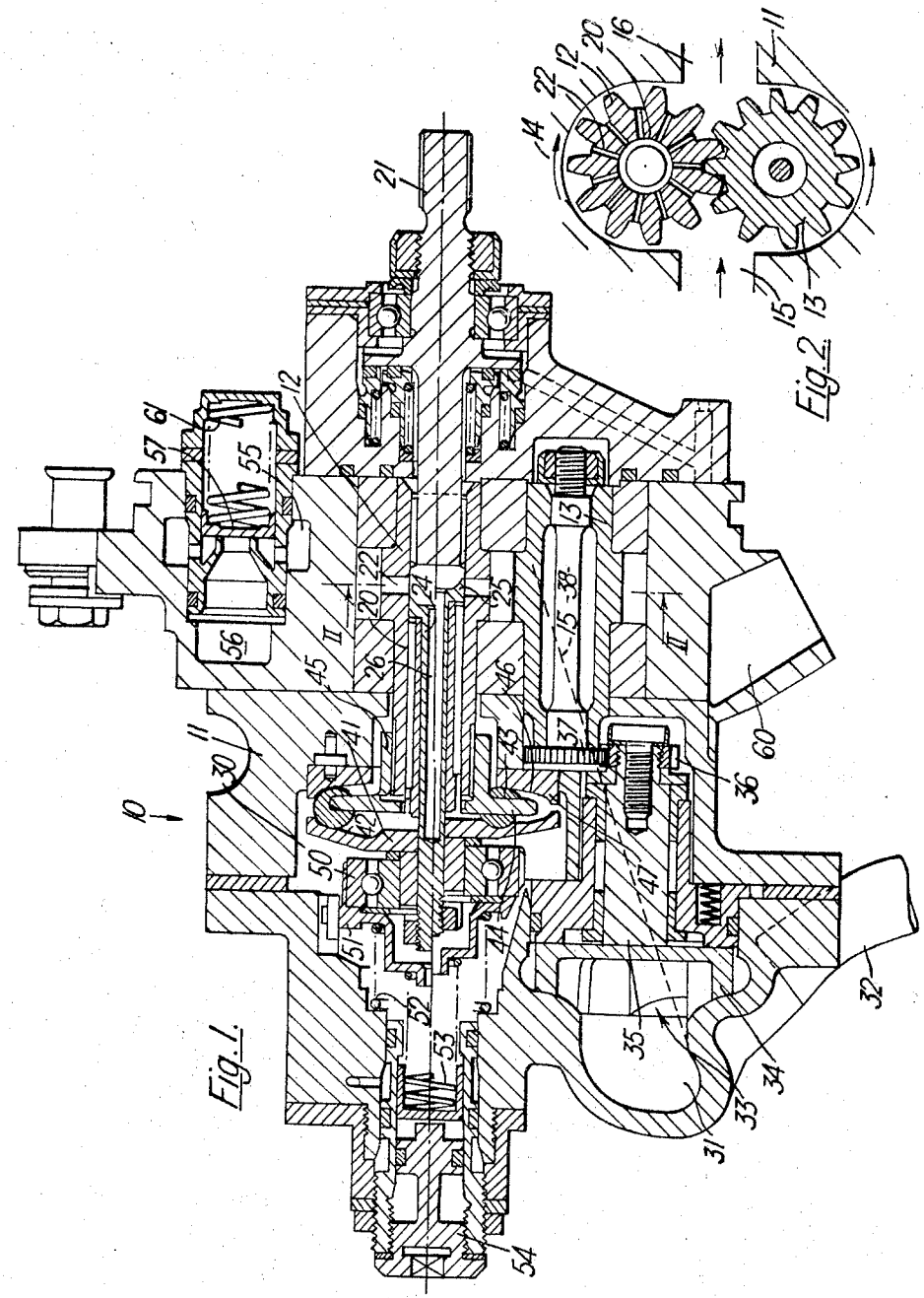

3,427,980
GEAR PUMP
Albert Jubb, Derby, and Christopher Linley Johnson, Allestree, Derby, England, assignors to Rolls-Royce Limited, Derby, England, a company of Great Britain
Filed Mar. 22, 1965, Ser. No. 441,512
U.S. Cl. 103—41    3 Claims
Int. Cl. F04b *49/08;* F04c *1/04*

This invention concerns a gear pump, e.g., for use in a gas turbine engine fuel supply control unit.

According to the present invention there is provided a gear pump comprising a body provided internally with an inlet passage, an outlet passage, and first and second gear members which are disposed between said inlet and outlet passages, the first and second gear members being in mesh with each other and being closely spaced from adjacent surfaces of the body, means for rotating the gear members so as to cause liquid supplied to the inlet passage to be pumped to the outlet passage, as a main flow of liquid, via the spaces between the respective gear members and the said surfaces, the first gear member having an axial passage and a plurality of angularly spaced apart radial passages therein, the axial passage communicating with the inlet passage, and each radial passage extending from the axial passage to the root of a tooth space of the first gear member, whereby, during the passage of the said main flow from the inlet passage to the outlet passage, a spill flow will pass from the outlet passage and via the radial and axial passages back to the inlet passage, a valve member which is adjustable to provide progressive variation of the relative proportions of said main flow and said spill flow, and control means which are arranged to adjust the valve member in dependence upon the rotational speed of the gear members.

Thus, as the said rotational speed increases, the said control means effects progressive opening of the valve member so as to increase the said spill flow.

The control means preferably comprises a centrifugal governor. Thus the first gear member may be provided with a part which rotates therewith, said part being itself provided with a radially movable weight or weights, the weight or weights being movable radially outwardly under centrifugal force so as to move the valve member.

The said part may be provided with radially movable balls which engage an inclined surface on a radially extending member which is connected to the valve member, resilient means being provided which urge the radially extending member into contact with the balls, radial movement of the balls causing axial movement of the radially extending member and hence of the valve member.

The valve member is preferably axially movable in the said axial passage and controls communication between the radial passages and the axial passage.

A relief passage may be provided which communicates with the outlet passage by way of a pressure relief valve, the pressure relief valve being arranged to open when the pressure in the outlet passage exceeds a predetermined value.

The invention also comprises a fuel supply control unit for a gas turbine engine, said unit incorporating a gear pump as set forth above.

Thus, the said unit may have mounted within the said body a backing pump which is adapted to pump liquid supplied thereto to the said inlet passage, the axial passage communicating with the inlet of the backing pump.

The backing pump may be a centrifugal pump having an impeller driven by the second gear member.

The invention is illustrated, merely by way of example, in the accompanying drawings, in which:

FIGURE 1 is a sectional view of a gas turbine engine fuel supply control unit incorporating a gear pump according to the present invention, parts of the said unit being shown in different positions on opposite sides of a centre line thereof, and FIGURE 2 is a cross-section taken on the line II—II of FIGURE 1.

The terms "left" and "right" as used in this specification are to be understood to refer to directions as seen in the drawings.

Referring to the drawings, a fuel supply control unit 10 has a body 11 within which there are rotatably mounted gear members 12, 13 which are in mesh with each other, the gear members 12, 13 being closely spaced from adjacent surfaces of the body 11. The gear members 12, 13 which are disposed between an inlet passage 15 and an outlet passage 16, are mounted closely within the body 11 so that, when they are rotated in the direction of arrow 14, they pump a main flow of liquid from the inlet passage 15 to the outlet passage 16 by means of the moving pockets which are formed between the gear teeth and the body 11.

The gear member 12 has an axial passage 20 therethrough in the right-hand end of which is splined a shaft 21 which is driven by the said gas turbine engine.

The gear member 12 is provided with a plurality of angularly spaced apart radial passages 22. Each of the radial passages 22 extends from the axial passage 20 to the root of a tooth space of the gear member 12. Thus, as the gear member 12 rotates, different radial passages 22 are brought successively into communication with the outlet passage 16 and the inlet passage 15. Accordingly, during the passage of the said main flow from the inlet passage 15 to the outlet passage 16, there is also a spill flow which passes from the outlet passage 16 and via the radial and axial passages 22, 20 back to the inlet passage 15.

Communication between the radial passages 22 and the axial passage 20 is controlled by a valve member constituted by a sleeve 24 whose right-hand end is provided with a peripheral flange 25. The sleeve 24 is axially slidable in the axial passage 20 whereby progressively to move the flange 25 towards and away from a position in which it completely blocks the radially inner ends of the radial passages 22. Accordingly, such axial sliding movement of the valve flange 25 serves to provide progressive variation of the relative proportions of the said main flow and the said spill flow, and hence variation in the output of the gear pump 12, 13.

The sleeve 24 has a space 26 therein which communicates with a chamber 30 within the body 11. The chamber 30 communicates (by means not shown) with the inlet passage 15.

A chamber 31 is adapted to be supplied with fuel through a passage 32 and is disposed on the low pressure side of a centrifugal backing pump 33. The inlet passage 15 of the gear pump 13, 14 communicates with the high pressure side of the centrifugal backing pump 33.

The centrifugal backing pump 33 has an impeller 34 which is mounted on a spindle 35. The spindle 35 is provided with a gear 36 which meshes with a gear 37, the gear 37 being driven by a spindle 38 which is splined within the gear member 13. Accordingly, the impeller 34 is driven by the gear member 13.

The sleeve 24 carries a radially extending disc 41 having an annular surface 42 thereon which is inclined with respect to the axis of the sleeve 24. The surface 42 contacts a pair of diametrically oppositely disposed balls 43 each of which is mounted in a radially extending slot (not shown) in a plate 44. The plate 44 is formed integrally with, or secured to, a sleeve 45 within which is splined the left-hand end of the gear member 12.

If desired, however, three or more balls 43 may, of course, be employed.

The balls 43 also engage a surface 46 on a fixed part 47 of the body 11, the surface 46 being inclined with respect to the axis of the sleeve 24. The surfaces 42, 46 are so inclined to each other that the space therebetween diminishes in a radially outward direction.

The disc 41 is rotatably mounted by means of a bearing 50 in an axially movable housing 51. Interposed between the body 11 and the housing 51 is a spring 52. There is also provided a spring 53 one end of which engages the housing 51 and the other end of which engages an adjustment screw 54 which is threaded in the body 11.

The springs 52, 53 thus urge the disc 41 into contact with the balls 43 whereby to urge the latter towards their radially inner positions. In these positions, the valve flange 25 completely closes the radially inner ends of the radial passages 22 so as to prevent any spill flow therethrough.

When, however, the gear members 12, 13 have reached a predetermined speed of rotation, centrifugal force will cause the balls 43 to move radially outwardly against the action of the springs 52, 53. This will cause the disc 41, and hence the valve flange 25, to be forced axially towards the left whereby to effect opening of the radially inner ends of the radial passages 22. Moreover as the rotational speed of the gear members 12, 13 increases beyond the said predetermined value, the said spill flow will progressively increase.

The outlet passage 16 extends to the burners (not shown) of the combustion equipment (not shown) of the said gas turbine engine, e.g., via a throttle control unit (not shown). The outlet passage 16 also communicates (by means not shown) with an annular chamber 55. The chamber 55 communicates with a relief passage 56 by way of a pressure relief valve 57, the relief passage 56 communicating (by means not shown) with a drain passage 60.

The pressure relief valve 57 is constituted by a piston which is acted upon in a valve closing direction by a spring 61. The arrangement is thus such that the pressure relief valve 57 will open to permit high pressure fuel to flow into the relief passage 56 when the pressure in the outlet passage 16 exceeds a predetermined value, such for example as 800 lbs. per square inch.

It will be appreciated that the fuel supply control unit shown in the drawings is of compact construction which makes it particularly suitable for mounting it in the nose cone of a vertical lift gas turbine engine where space is limited.

We claim:

1. In a gear pump structure having a body provided internally with an inlet passage and an outlet passage, a gear pump having a spill flow, a valve means and speed responsive means operable dependent upon the speed of the gear pump to control the extent of spill flow, said gear pump having first and second gear members which are in mesh with each other and are disposed between said inlet and outlet passages, the body having surfaces disposed adjacent to the first and second gear members, means for rotating the gear members so as to cause liquid supplied to the inlet passage to be pumped to the outlet passage as a main flow of liquid via the spaces between the respective gear members and the said surfaces, the first gear member having an axial passage and provided with an annular series of angularly substantially equidistantly spaced apart and axially coplanar radial passages therein for spill flow, the axial passage by means of its end remote to said radial passages communicating with the inlet passage, and each radial passage extending from adjacent the other end of the axial passage to the root of a tooth space of the first gear member, whereby, during the passage of the said main flow from the inlet passage to the outlet passage, a spill flow will at all times pass from the outlet passage and via the axial passage and all the radial passages back to the inlet passage, said valve means being a member which is axially movable in the said axial passage across the adjacent ends of the radial passages to vary the extent of opening and/or closing of such passages to regulate spill flow.

2. A gear pump structure according to claim 1 wherein said speed responsive means includes a part which rotates with the first gear member, radially movable balls carried by said part, a radially extending member which is connected to the valve member having an inclined surface engaged by said balls, and resilient means which urge the radially extending member into contact with the balls, the radial movement of the balls causing axial movement of the radially extending member and hence of the valve member to an extent in dependence upon the rotational speed of the gear members, the balls as the said rotational speed increases effecting progressive opening of the valve member so as to increase the said spill flow.

3. A gear pump structure according to claim 1 wherein said speed responsive means is a centrifugal type governor which is driven by one of the gear members and which axially moves the valve member to increase the spill flow as the rotational speed of the gear members increases.

References Cited

UNITED STATES PATENTS

| | | | |
|---|---|---|---|
| 1,602,208 | 10/1926 | Price | 123—140 |
| 1,906,334 | 5/1933 | Rathburn | 158—36.4 |
| 1,912,737 | 6/1933 | Svenson | 103—126 |
| 1,978,480 | 10/1934 | Svenson | 103—126 |
| 2,188,848 | 1/1940 | Svenson | 103—126 |
| 2,516,147 | 7/1950 | Robinson | 158—36.4 |
| 2,560,118 | 7/1951 | Malone et al. | 158—36.4 |
| 2,581,276 | 1/1952 | Mock | 158—36.4 |
| 2,594,689 | 4/1952 | Sharp et al. | 158—36.4 |
| 2,599,680 | 6/1952 | Weeks | 103—5 |
| 2,640,572 | 6/1953 | O'Brien | 60—54 |
| 2,688,925 | 9/1954 | Thoren et al. | 158—36.4 |
| 2,758,443 | 8/1956 | McKee | 60—54 |
| 2,876,705 | 4/1959 | Aspelin et al. | 103—5 |
| 2,915,976 | 12/1959 | Demtchenko | 103—41 |
| 2,955,537 | 10/1960 | Gaubatz | 103—126 |
| 3,168,084 | 2/1965 | Simonet | 158—36.4 |

MARK NEWMAN, *Primary Examiner.*

W. J. KRAUSS, *Assistant Examiner.*

U.S. Cl. X.R.

103—126